M. J. TILLER.
POWER TRANSMISSION UNIVERSAL JOINT.
APPLICATION FILED JAN. 25, 1918.
1,274,213.
Patented July 30, 1918.
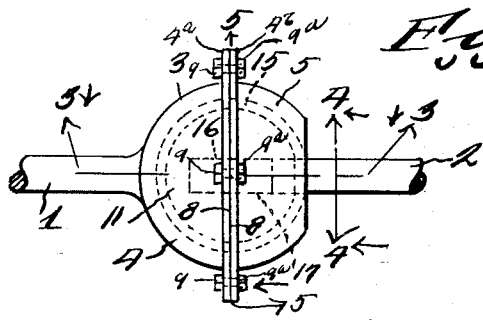
Witnesses
Inventor
M. J. Tiller
Attorneys

UNITED STATES PATENT OFFICE.

MARTIN J. TILLER, OF WANAMINGO, MINNESOTA.

POWER-TRANSMISSION UNIVERSAL JOINT.

1,274,213.

Specification of Letters Patent.

Patented July 30, 1918.

Application filed January 25, 1918. Serial No. 213,678.

*To all whom it may concern:*

Be it known that I, MARTIN J. TILLER, a citizen of the United States, residing at Wanamingo, in the county of Goodhue, State of Minnesota, have invented a new and useful Power-Transmission Universal Joint; and I do hereby declare the following to be a full, clear, and exact description of the invention, such as will enable others skilled in the art to which it appertains to make and use the same.

This invention relates to an improved power transmission universal joint, and one of the objects of the invention is to provide an improved, simple, efficient and practical joint, whereby a positive connection between two adjacent ends of a pair of shaft sections may be made so that power transmission may be positively transmitted from one section to the other.

A further object of the invention is to provide an improved universal joint comprising a spherical hollow member on one end of one of the shaft sections, a disk integral on the adjacent end of the other shaft section, and a spherical member fitting the first spherical member and having a cavity corresponding to and receiving said disk, the two spherical members, each consisting of two parts, the parts of each spliced together at right angles to the parts of the other spherical member, the inner spherical member having flanges where its parts engage to enter a groove of the interior of the outer spherical member, thereby insuring a positive but universal joint between the two shaft sections.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the improved universal joint constructed in accordance with the invention.

Fig. 2 is a sectional view through the same.

Fig. 3 is a sectional view on line 3—3 of Fig. 1 and at right angles to the sectional plane of Fig. 2.

Fig. 4 is a sectional view on line 4—4 of Fig. 1.

Fig. 5 is a sectional view on line 5—5 of Fig. 1, showing the edge of one of the parts of the outer spherical member in elevation.

Referring more especially to the drawings, 1 and 2 designate two shaft sections, which may be axially alined or at an angle to each other. An outer spherical member 3 is provided and it consists of two parts 4 and 5, the semi-spherical hollow part 4 is integrally connected to the shaft section 1, while the other semi-spherical part 5 has an opening 6, whereby the shaft section 2 may be connected to an inner spherical member 7. The two parts 4 and 5 have their adjacent edges 8 engaging, and which edges are concentric with the shaft section 1. Adjacent the edges 8 the parts 4 and 5 are provided with annular flanges $4^a$ and $4^b$, which receive the bolts 9 provided with nuts $9^a$, so as to secure the parts 5 and 4 securely together as shown. The outer spherical member 3 is provided on its inner surface with an annularly extending recess 12, which extends at right angles to the adjacent edges 8 of the parts 4 and 5. Where the opening 6 is constructed the recess 12 ceases or is cut away. The inner spherical member comprises two parts 13 and 14, which are semi-spherical in cross section and have their adjacent faces engaging at right angles to the engagement of the edges 8. The parts 13 and 14 of the inner spherical member where their adjacent faces engage are provided with annular flanges 15, forming a rib, to engage the recess 12, thereby permitting the inner spherical member to rock in the outer spherical member. The adjacent engaging edges or faces of the two parts 13 and 14 respectively have teeth (which are V-shaped) and correspondingly shaped depressions $13^a$ and $14^a$, and which interengage to prevent said sections 13 and 14 from sliding on each other. The shaft section 2 is provided with a disk shaped head 16, and the parts 13 and 14 of the inner spherical member are provided with semi-circular recesses 17, which when the parts 13 and 14 are in engagement as shown in the drawings, particularly Fig. 3, a circular cavity is formed for the reception of the disk head of the shaft section 2. It is to be noted that the disk head and its cavity is at right angles to the recess 12 (which receives the flanges 15) and at right angles to the meeting edges 8 of the parts 4 and 5, consequently, since the shaft section 2 extends through the opening 18 (which adjoins the cavity formed by the semi-circular recesses 17), said shaft sections 1 and 2 may extend axially or at an angle to each other, and yet permit a positive transmission of power from one to the other.

The invention having been set forth what is claimed as new and useful is:—

In a universal joint for positive power transmission, a pair of shaft sections, inner and outer spherical members, one engaging within the other, the outer spherical member being integrally connected to one of the shaft sections and consisting of two semi-spherical parts having their adjacent engaging edges concentric with the shaft section which is integrally connected to the outer spherical member, means for securing the two parts together, the interior wall of the outer spherical member having an annular recess at right angles to the joint between the two parts, one of said parts having an opening for the other shaft section, the inner spherical member consisting of two parts, the two parts of the inner spherical member where they adjoin having flanges forming a rib to engage said annular recess, the two parts of the inner spherical member having semi-circular recesses, which, when said parts of the inner spherical member are brought together, form a circular cavity, said inner spherical member having an opening adjacent the first opening the other shaft section extending through said openings and having an integral circular disk head engaging said circular cavity.

In testimony whereof I have signed my name to this specification in the presence of two subscribing witnesses.

MARTIN J. TILLER.

Witnesses:
MARTIN HALVORSON,
HENRY M. HALVERSON.

Copies of this patent may be obtained for five cents each, by addressing the "Commissioner of Patents, Washington, D. C."